(12) United States Patent
Wagner et al.

(10) Patent No.: US 8,171,536 B2
(45) Date of Patent: May 1, 2012

(54) METHOD AND APPARATUS FOR AUTHENTICATING USERS IN A NETWORK

(75) Inventors: Steven Wagner, Foster City, CA (US); Eric Whelpley, Foster City, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 1032 days.

(21) Appl. No.: 11/752,818

(22) Filed: May 23, 2007

(65) Prior Publication Data

US 2008/0295162 A1 Nov. 27, 2008

(51) Int. Cl.
*G06F 7/04* (2006.01)
(52) U.S. Cl. .................................. 726/10; 726/5; 726/8
(58) Field of Classification Search .................... 726/10, 726/5, 8
See application file for complete search history.

(56) References Cited

OTHER PUBLICATIONS

Menezes, et al. (1996). Handbook of Applied Cryptography. pp. 500-503.*
PSP (2005). Instruction Manual PSP-1001.*
Garman (Kerberos: The definitive guide, 1st edition, 2003) pp. 6-7 and 21-43.*
International Search Report and Written Opinion issued in International Patent Application No. PCT/US08/58994 on Sep. 4, 2008.

* cited by examiner

*Primary Examiner* — Ashok Patel
*Assistant Examiner* — Brian Shaw
(74) *Attorney, Agent, or Firm* — Procopio, Cory, Hargreaves & Savitch LLP

(57) ABSTRACT

Methods, apparatuses, and techniques for authenticating users of a network are described. Once a user has been authenticated on a first network, authentication information from the first network can be used by the user to gain access to the user's accounts on other networks using the same or different network enabled devices or consoles.

31 Claims, 9 Drawing Sheets

METHOD AND APPARATUS FOR AUTHENTICATING USERS IN A NETWORK

BACKGROUND

1. Field of the Invention

The present invention relates to a communication network, and more specifically, to authenticating users in such a communication network.

2. Background

In typical communication network applications, such as online games, players may interact and communication with partners and virtual worlds during the online experience. The effectiveness of the experience can be important to the player, who may have many choices of online games and other activities. The effectiveness of the experience is also important to online game providers in retaining players to be engaged in the games offered by the providers.

Players of the online games typically setup accounts on various service, or game, providers. The accounts are used, for example, to maintain profiles of the user, game statistics, buddy lists, and the like. In order to maintain integrity of the user's account, a user typically needs to use a password to authenticate themselves and to gain access their accounts. Use of passwords at the various service providers requires the player to remember account and password information for each of the service providers. As the player uses more and more service providers maintenance of many passwords can be a burden to the player.

To maintain a quality of play, game providers may wish to restrict access to authenticate player, for example players that have specific game consoles. By limiting access to specific game consoles the game provider has confidence that the player's interaction with the game is consistent across multiple players and multiple titles. For example, a game provider may not want a player to use a personal computer (PC) to play a game that was designed to be player with a specific game console. While limiting a players access in this way may maintain a desired level of quality it may also be burdensome to the user to limit access to their accounts in this way. For example, if a player only wants to check for messages from his buddies they may not be able to because they do not have access to the required game console at that time.

Thus, there is a need for improving authentication of users that access a communication network.

SUMMARY

Embodiments of the present invention provide methods, systems, apparatus, and programs for authenticating users of a network. In one embodiment, a first, closed or secured, network limits access to the network to authenticated users. Once the user has been authenticated on the secure network the user can then use authentication information received from the secure network to access a service provider network in a second open network. In other words, the service provider uses the authentication information from the closed network to determine if the user should be allowed to access the service provider.

In another embodiment, the authentication information can be transferred by the user to another network enabled device used to access the service provider network, or the secured network. In this way, the user can be associated with the same authentication information on different network enabled devices.

In one embodiment, a method for accessing a network includes, accessing a first network by a user and authenticating the user. Then generating a ticket associated with the user. An encrypted ID file associated with the user is generated based on information in the ticket and a user password. The user then uses the ID file to access service providers within a second network.

In another embodiment, a method of generating an ID file associated with a user includes receiving authentication information about the user from a secure network. Then providing user data, that includes the authentication information and a user password to an ID file service. The ID file service assembles desired user data and the password into an intermediary file, then encrypts the intermediary file into a signed ID file. Then the signed ID file is provided to the user and the user can use the signed ID file to access various networks.

In an embodiment, the ID file includes information that is unique to the user. In this way, once the service providers have authenticated the user, the service providers can thereby provide the user access to their accounts.

In addition, the ID file can include triggering data that will activate upon the occurrence of a predetermined event. The ID file can also be updated. For example, the ID file can be updated with information about activity on a network. Then, when the user enters a different network, or reenters a network that had been previously entered, the updated ID file can be used for access. After the user has been authenticated the updated information can be used to modify, or adjust, the user's accounts on the network in response to the activity on another network.

Examples of network enabled devices that can be used by a user to access the various networks and service providers include any device that can access a network such as game consoles, personal computer (PC), personal digital assistant (PDA), cell phones, set-top boxes, and the like.

Other features and advantages of the present invention will become more readily apparent to those of ordinary skill in the art after reviewing the following detailed description and accompanying drawings.

DETAILED DESCRIPTION

After reading the following description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

Various embodiments of the methods, apparatus, techniques, programs, and system described herein provide for authenticating users of a network. For example, in one embodiment, a first, closed or secured, network limits access to the network to authenticated users. Once the user has been authenticated on the secure network the user can then use authentication information received from the secure network to access a licensed, or unlicensed, service provider network in a second network. In other words, the service provider in the second network uses the authentication information from the closed network to determine if the user should be allowed to access the service provider. In another embodiment, the authentication information can be transferred by the user to another unlicensed network enabled device, used by the user to access the licensed service provider network. In another embodiment, the authentication information can be transferred to another licensed or unlicensed network enabled device and used by the user to access an unlicensed service provider network. In this way, the user can be associated with the same authentication information on different network enabled devices and on both licensed and unlicensed service providers. Examples of network enabled devices that can be used by a user include any device that can access a network such as game consoles, personal computer (PC), personal digital assistant (PDA), cell phones, set-top boxes, and the like.

Figure 1:
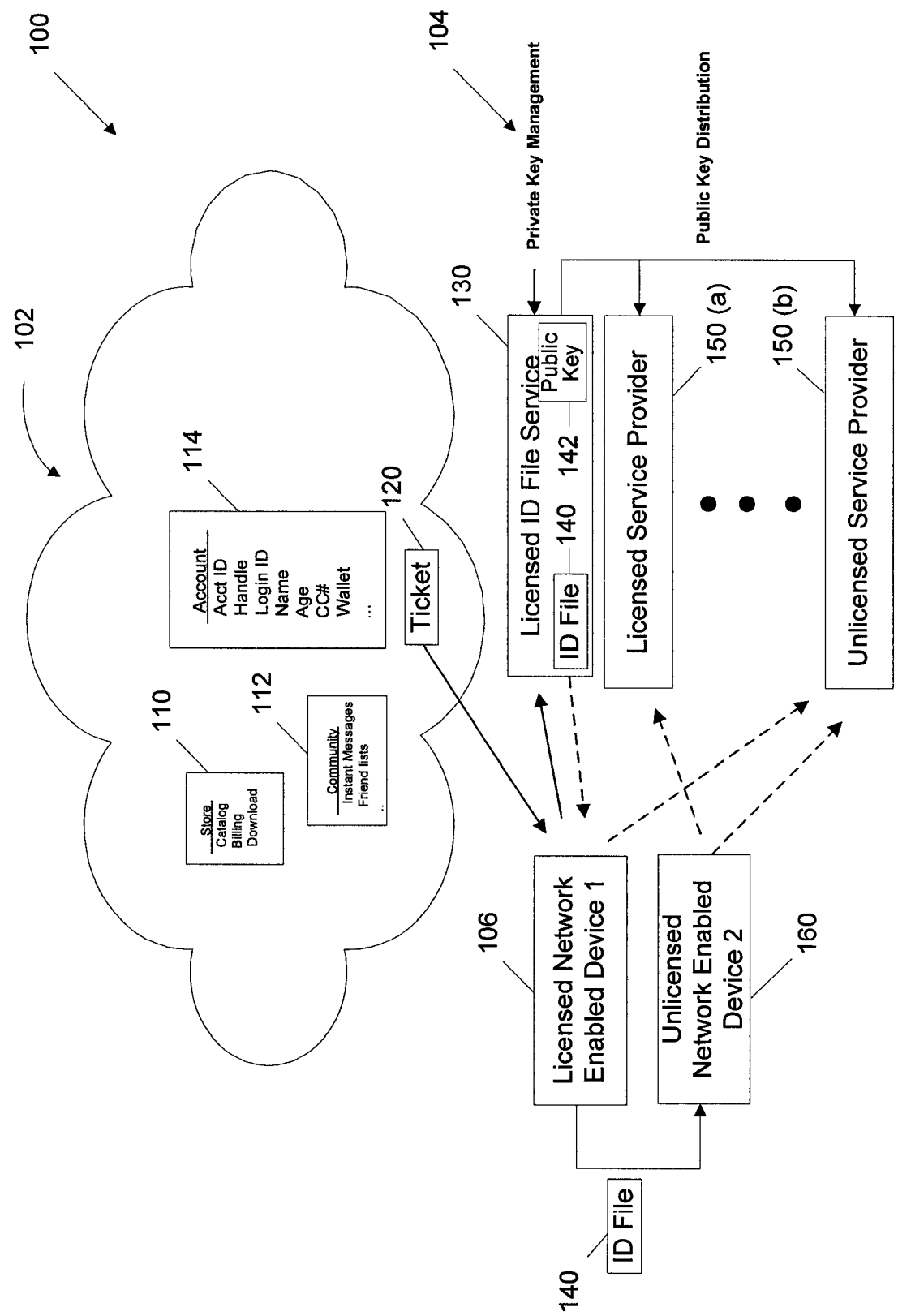
FIG. 1 is a block diagram illustrating an authentication system in accordance with an embodiment of the present invention.

FIG. 1 is a block diagram illustrating an authentication system in accordance with an embodiment of the present invention. As shown in the example of FIG. 1, the authentication system 100 includes a first network 102 and a second network 104. A first user network enabled device 106 can be used to access the first network 102 and the second network 104. In one embodiment, the first network can be a closed or secured network and the second network can be an open service provider network.

In one embodiment, access to the closed network 102 can be limited to a set of authorized users such as users that are using a particular network enabled device, or category of network enabled devices. For example, access to the closed network 102 can be limited to users that are using a particular licensed game console. In one embodiment the closed network 102 issues tokens of authentication to preserve the integrity of the closed network. Once a user has been authenticated they can be provided a token of authenticity that allows the user to navigate about the network.

For example, the closed network 102 can authenticate a user by verifying that the network enabled device used to access the closed network 102 has a serial number of other form of identification that identifies the network enabled device to be of a particular category. Once it is determined that the network enabled device is authorized, the network can provide a token, or ticket, to the network enabled device allowing the network enabled device to navigate the network. In one embodiment, by limiting that access to the closed network 102 to a particular type of game controller, uniformity of play in a game, as well as across different game titles, can be maintained. In addition, the user's network identity can be tracked across multiple titles. The closed network 102 can also include a merchandise, or store, module 110 where user's can purchase merchandise. In addition, the closed network 102 can include a service module 112 that permits users to setup various network communities, for example instant messaging communities and friends lists and the like.

In one embodiment, access to the closed network 102 is accomplished by a licensed user network enabled device 106 requesting access. A server, or network controller, in the closed network 102 authenticates the user. When the user is authenticated the user is granted access to their user account module 114. The user account module 114 maintains information about the user, such as, the user's handle, login name, credit card number, and other information that the user provided in a previous session in the closed network 102. If the user does not have an existing account, then an application on the server can be run to collect user information and setup the account. In addition, a user can modify the information in their account.

The server in the closed network 102 can issue a file, referred to as a ticket, or token, of authentication 120 to the licensed user network enabled device 106. The ticket of authentication 120 can include some of the information from the user's account. For example, the ticket can include a unique network identifier, a network login ID, the user's handle, and the like. The ticket might also include information relating to account privilege levels, entitlements and account preferences. Typically the ticket will generally not include sensitive personal information such as credit card information.

In one embodiment the user network enabled device 106 can use the ticket 120 generated on the closed network 102 to access a second, service provider, network 104. In this way the service provider knows that the user has been authenticated by the closed network 102. The service provider also knows the identity of the user based on information in the ticket. For example, the user network enabled device 106 can communicate the ticket 120 to a licensed ID file server 130 in the service provider network 104. The ID file server 130 validates the ticket 120. The ticket validation process requires that the ticket be correctly decrypted and the source signature verified using technology compatible with closed network 102.

In one embodiment, after the ticket 120 has been validated by the licensed ID file service 130 the ID file service 130 assembles, encrypts, and signs an ID file. In one embodiment, signing the ID file is done using techniques known to those of skill in the art and that are referred to as public/private key techniques.

The signed ID file 140 is communicated from the licensed ID file service 130 to the user network enabled device 106. The ID file service 130 also communicates a copy of the public key 142 to the licensed and unlicensed service providers 150 (a, b) in the network 104. When the user wants to access an unlicensed service provider 150 (b), the user network enabled device 106 communicates the signed ID file 140, and a password provided by the user, to the unlicensed service provider 150 (b). The unlicensed service provider 150 (b) uses the copy of the public key received from the ID file service 130 to decrypt the ID file 140. The unlicensed service provider 150 (b) then verifies that the password from the ID file 140 matches the password provided by the user. In another embodiment, the user network enabled device 106 can communicate the ID file 140 to the unlicensed service provider 150 (b) and the unlicensed service provider 150 (b) can then request the user password.

If the password from the ID file 140 and the password provided by the user match, then the user network enabled device 106 is allowed access to the unlicensed service provider 150 (b). In this way, the user can use the same password and account information to access multiple licensed and unlicensed service providers 150, thereby eliminating the need for a user to maintain multiple accounts and passwords for different service providers 150.

In one embodiment, the licensed ID service 130 can be included within a licensed service provider 150. In other embodiments, the licensed ID service provider can be included in other locations, for example, it can be a stand alone service, or it can be included in the closed network 102, or in the user network enabled device 106.

In an embodiment, multiple service providers can be grouped and the same public/private key combination used to sign their respective ID files. In another embodiment, a different private/public key can be used for each individual service provider.

Continuing with FIG. 1, the licensed user network enabled device 106 can export, or other wise communicate the ID file 140 to a second unlicensed network enabled device 160. In one embodiment, the licensed user network enabled device 106 and the second unlicensed network enabled device 160 can both be the same category, or type, of network enabled device. In other embodiments, the second unlicensed network enabled device 160 can be a different category of network enabled device than the licensed user network enabled device 106.

For example, the licensed user network enabled device 106 can be a particular category of game console, such as a member of a family of game consoles manufactured by a particular manufacture, or group of manufacturers. The game console may have access to the closed network 102 because the closed network is associated with the game console manufacturer and access to the closed network 102 is restricted to only allow authorized game consoles identified by the manufacture to have access. In this example, once authorized, the game console can receive a ticket from the closed network. The game console can then communicate the ticket to the licensed ID file service 130 and receive a signed ID file 140. The game console can then use the ID file 140 to access licensed and unlicensed service providers 150. The service provider knows that the user has been authenticated by the closed network 102 and also knows additional information about the user such as their identity from information in the ID file 140.

The game console can also export, or communicate, the ID file 140 to the second unlicensed network enabled device 160, and the second network enabled device can use the ID file 140 to access the licensed and unlicensed service provider 150. In one embodiment, the second network enabled device 160 is another game console. In other embodiments, the second network enabled device 160 can be a personal computer, a game console from a different manufacture, a personal digital assistant, a cell phone, set-top box or other network capable device.

In the above example, the second unlicensed network enabled device 160, using the ID file 140, can access an account or account information on a licensed and unlicensed service provider. In this way a user can access their account information using different licensed and unlicensed network enabled devices. For example, a user can setup an account, using a game console, on the first closed network 102 and establish associated account information on a licensed or unlicensed service provider 150 in the second network 104. Later, the user can access their account information using a different unlicensed network enabled device, such as a PC. In this way, a user is not restricted to only being able to access their account information with a particular licensed network enabled device but are able to access their account information from different network enabled devices at different locations. Once the user has accessed their account they can then use the account to perform various functions, such as play games, email friends, purchase items, check for message, etc.

Figure 2:
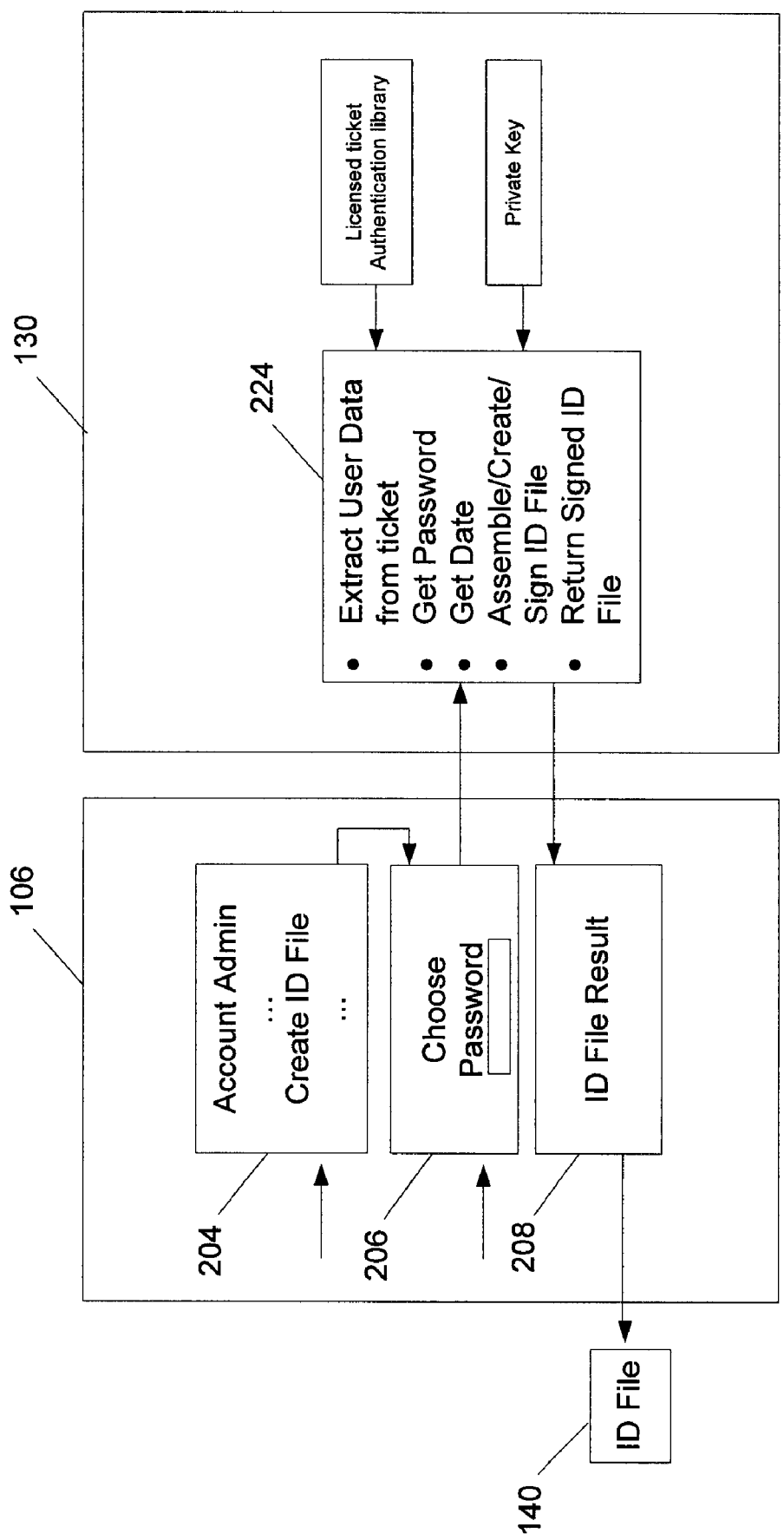
FIG. 2 is a block diagram illustrating an embodiment for creating an ID file.

FIG. 2 is a block diagram illustrating an embodiment for creating an ID file such as the ID file 140 of FIG. 1. As shown in FIG. 1, the licensed user network enabled device 106 receives a ticket from the closed network 102 after the user has been authenticated. The user can then engage an account administration module, or program, 204 and request that an ID file 140 be created. For example, a user may want to create an ID file 140 when initially beginning service, or the user may want to create an ID file 140 because the user has changed some of the user's information that is included in the ID file.

In one embodiment, the account module 204 can activate a password module 206 to receive a user's password. For example, if user is generating an ID file 140 for the first time, or the user is changing their password, the password module 206 can receive a password from the user. The user network enabled device 106 then communicates the ticket, password, and any other information needed to the ID file service 130 in FIG. 1.

The ID file service 130 operates an ID file module 224 that extracts desired user data from the ticket using licensed technology compatible with the closed network 102. The ID module 224 also obtains the password and any other desired information, for example the current date. The ID module 224 then assembles data in to an intermediary file, encrypts the intermediary file using a private key to make a signed ID file 140. The signed ID file 140 is communicated to an ID file module 208 in the user network enabled device 106. The ID file 140 will likely include, but not be limited to information made available via the ticket. Additional information can include data not associated with the closed network 102, but pertinent only to one or more of the service providers 150.

In one embodiment, the ID file module 208 can then export, or save, the ID file 140 to a storage device so that the ID file 140 can be installed on another network enabled device. In another embodiment, the ID file module can communicated to another network enabled device through a network, either wired or wireless. For example the ID file 140 can be communicated between two network enabled devices that are on a wired or wireless local area network, or via a wireless communication such as a Blue Tooth interface or other communication network.

Figure 3:
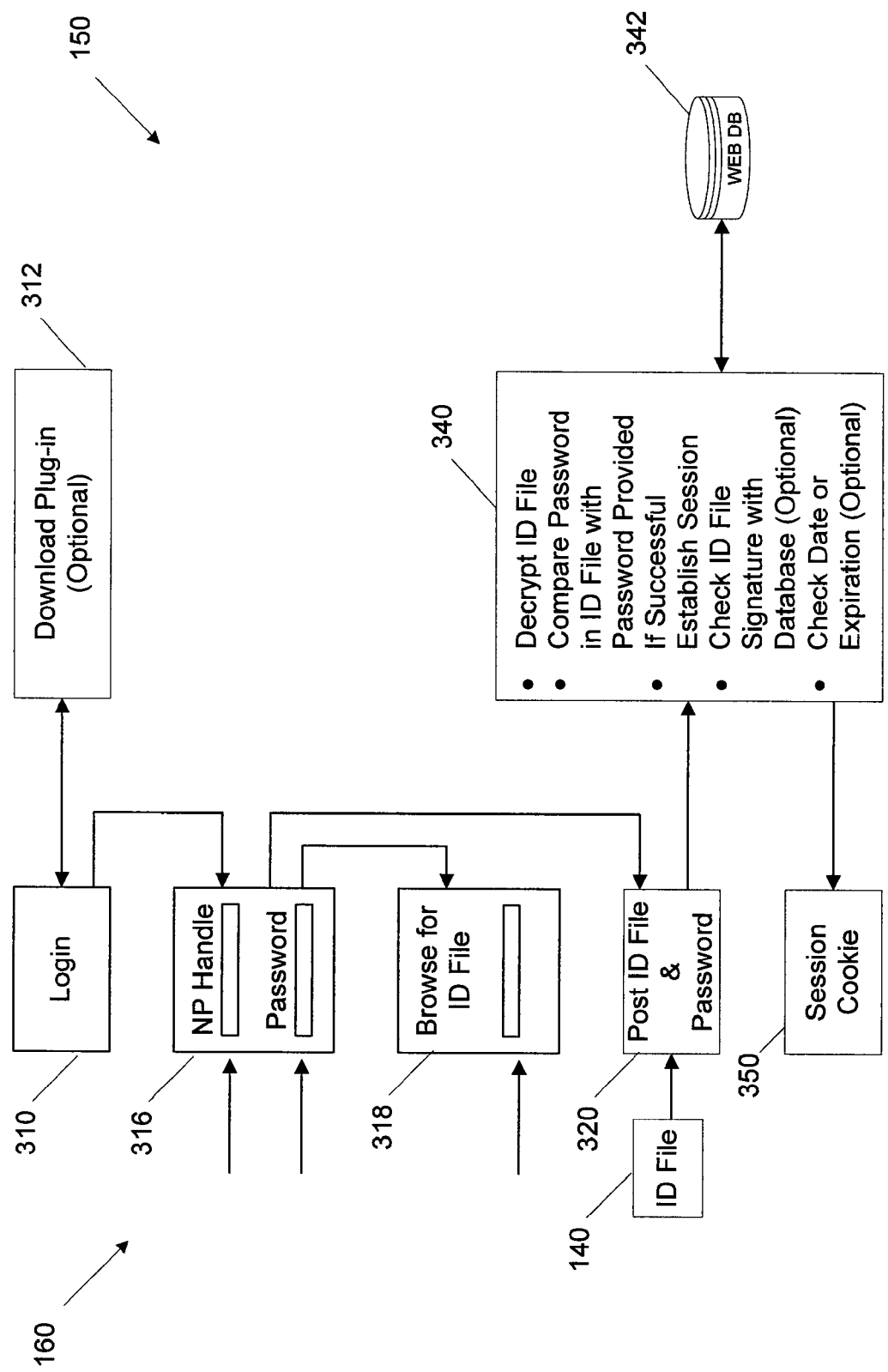
FIG. 3 is a block diagram of accessing a service provider using an ID file generated on a different network enabled device.

FIG. 3 is a block diagram of accessing a network or service provider using an ID file 140. As shown in FIG. 3, a network enabled device 160 uses a browser 310 to access or log on to a service provider 150. The network enabled device can download a browser plug-in 312 if necessary.

A password module 316 in the network enabled device 160 receives input from a user, such as the user's handle. The user's handle information identifies the user and can also be used to identify an ID file 140 associated with the handle. The password module 316 is provided, or retrieves, the ID file 140. For example, the password module 316 can retrieve the ID file 140 from memory, or a storage device, either fixed or removable. The password module 316 also receives the user's password.

The password module can use the user's handle information to search for the ID file 140 in a predetermined location within storage media in the network enabled device. For example, the storage media can include a hard drive, RAM, ROM, or a removable media drive, such as a memory stick, or other types of storage media. If the ID file 140 is not found, the password module 316 can present the user with a browser module 318 and let the user identify the location of the ID file.

A communication module 320 then communicates the ID file 140 and password to the service provider 150. At the service provider an authentication module 340 receives the ID file 140 and the password. The authentication module 340 decrypts the ID file 140 and compares the password in the ID file 140 to the password provided by the user. If the passwords do not match then the user is denied access to the service provider 150. If the passwords do match, indicating that he user is associated with the ID file 140, then the service provider 150 will establish a WEB session. For example, the service provider 150 may return a session cookie 350 to the network enabled device.

The authentication module 340 optionally checks the ID file 140 signature with known signatures in a database 342 accessed by the service provider 150. The authentication module 340 can also, optionally, check the ID file 140 date or expiration to determine if the ID file 140 is still timely or if it has expired.

The network enabled device used to access the services provider can be the same network enabled device that was used to create the ID file 140 or a different network enabled device. For example a first network enabled device can be used to create the ID file 140 and then the ID file 140 can be transferred to a second network enabled device. In this way, a user can transfer their ID file 140 to multiple network enabled devices and use the different network enabled devices to access their accounts on different networks.

Figure 4:
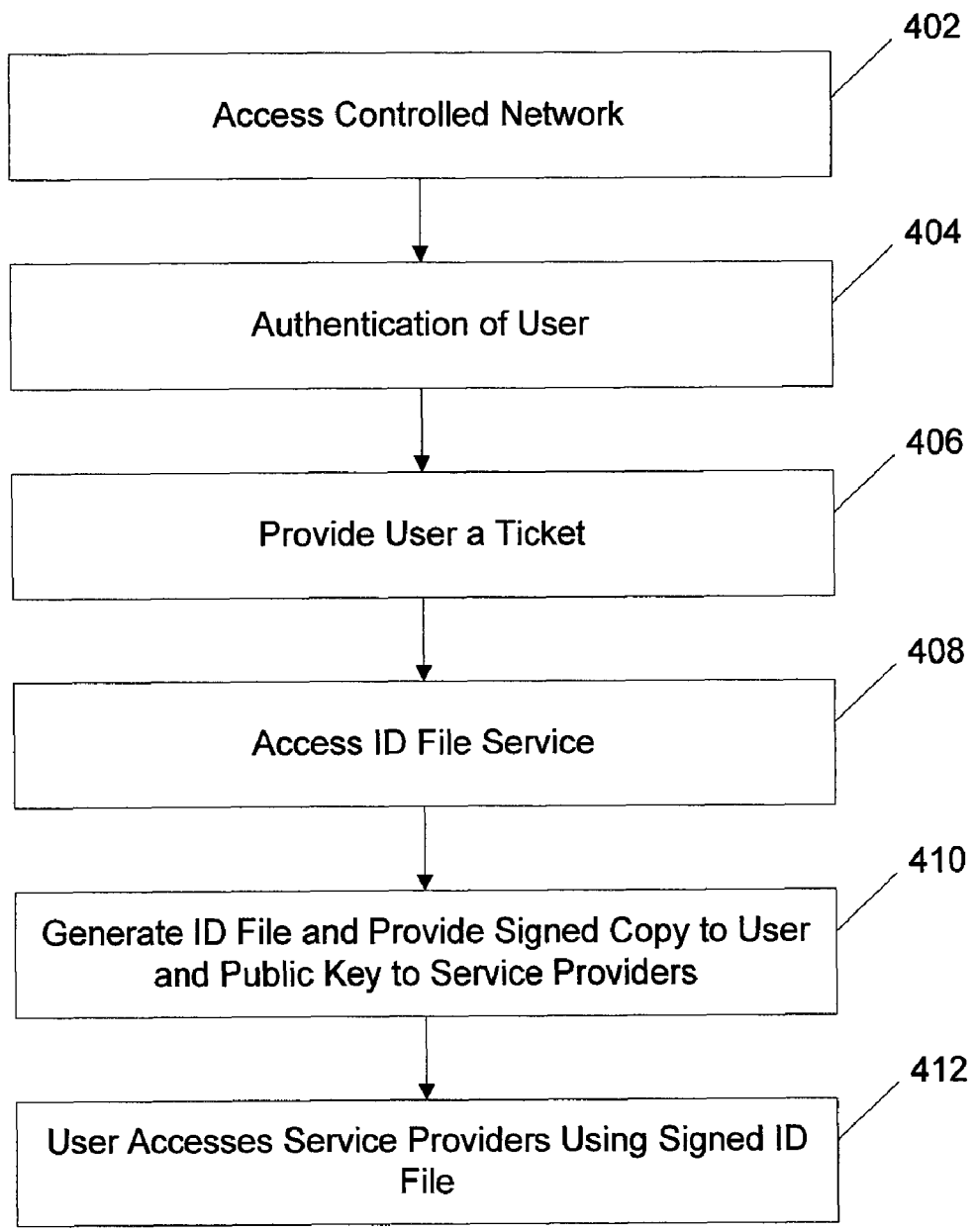
FIG. 4 is a flow chart illustrating an embodiment of accessing a network.

FIG. 4 is a flow chart illustrating an embodiment of accessing a network as described in FIGS. 1 and 3. Flow begins in block 402 where a user uses a network enabled device to access a first, controlled network. Flow continues to block 404 where the user is authenticated by the first, controlled network. Flow then continues to block 406 and the first network communicates an authentication ticket to the user. The ticket can include, for example, information about the user as well as information confirming that the user has been authenticated by the first network.

Flow continues to block 408 and the user accesses a licensed ID file service. The ID file service receives the ticket and a password from the user. In block 410 the ID file service verifies that the user was authorized by the first network. The means for this is determined by specifications of the controlled first network, and might require licensed ticket authentication software to be run on the ID file service 130. Then the ID file service generates an ID file 140 for the user and communicates a copy of the ID file 140 to the user. In one embodiment the ID file 140 is signed using public/private key techniques. In block 412 the user accesses service providers using the signed ID file.

Using the techniques described, a user can use a first network enabled device to access and be authenticated by a first network. The user can then use the authentication from the first network on a second network enabled device to access a second network. During interaction with a service provider in the second network, the user can engage in activities such as purchasing goods or services for use on the second network enabled device or for use on the first network enabled device. For example, a user may access the second network to log onto a service provider and purchase a movie, game, linear program, music, movies, television program, episodic content, or other entertainment programming for use on the second network enabled device or for use on the first network enabled device. In one example, the user can use a PC (second network enabled device) to access a service provider and purchase a movie. The movie can then be downloaded or pushed to a user's first network enabled device, such as a game console. In one example, if the game console is on, then the movie can be pushed to it immediately, or if the game console is off then the movie can be queued by the service provide and downloaded or pushed to the game console when it is turned on.

In another embodiment, a user can use the first network enabled device, such as a game console, to access a service provider, such as a game site. The user can use the game controller to interact, or "play" the game. The user can then log onto the same game site with a second network enabled device, such as a PC, using the ID file. The site will recognize the user and allow the user to enter the same game environment at the point that they left when playing the game earlier. In this example, a user can play the same game using different network enabled devices, such as game console and PC. When the user logs onto the site, they can query the site to determine what activity has occurred using the user's account on the site. In this way, the user can determine if there has been activity on their account that they are not aware of.

In still another embodiment, the ID file 140 that is transferred between the first and second network enabled devices can include information about the activities that have occurred on each network enabled device, as well as other information to be communicated between the two network enabled devices. For example, the ID file 140 transferred from the first network enabled device to the second network enabled device can include information, or trigger data that will activate if a predetermined event occurs on the second network enabled device. The ID file 140 can also include advertising, activity information, or profile data. Likewise, the ID file 140 transferred from the second network enabled device to the first network enabled device can include information, or trigger data that will activate if a predetermined event occurs on the first network enabled device, as well as advertising, activity information, or profile data. For example, the ID file 140 can be updated to include information about which web sites have been visited by a network enabled device or other network enabled device activity.

Figure 5:
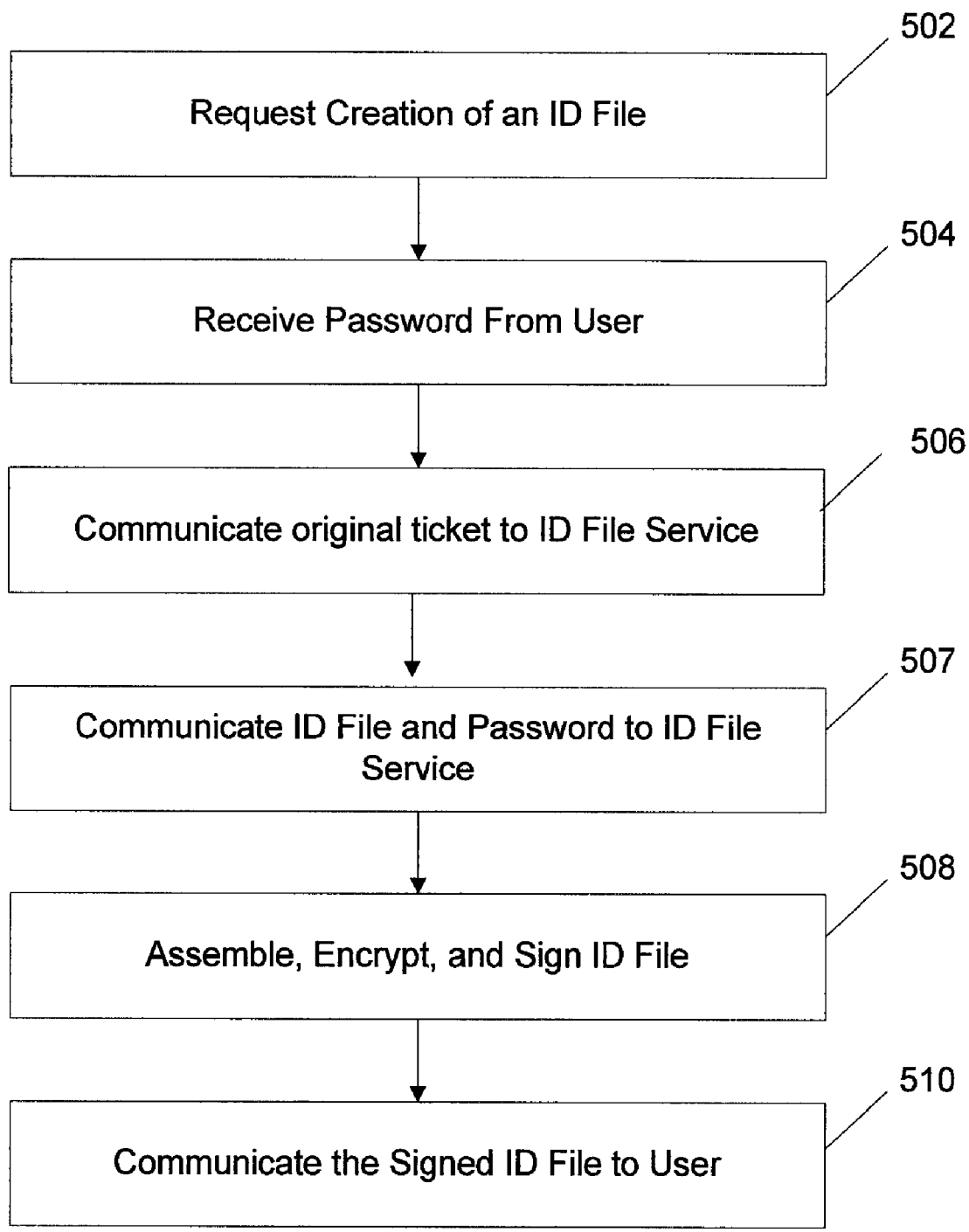
FIG. 5 is a flow chart illustrating an embodiment of creating an ID file.

FIG. 5 is a flow chart illustrating an embodiment of creating an ID file such as the ID file in FIGS. 1-3. Flow begins in block 502 where a user request that an ID file be created. Flow continues to block 504 where the user is prompted to enter a password. Then in block 506 a ticket originally received by the user from a secure network is communicated to an ID file service. The information about the user can include profile information about the user as well as authentication data from a security network.

Flow continues to block 507 where the an ID file and password to the ID file are communicated to an ID file service. Then in block 508 the ID file service verifies the ticket authenticity, assembles desired items of data and the password into an intermediary file, and then encrypts the intermediary file into a signed ID file 140. The ID file 140 can be signed, for example, using a public/private key. Flow continues to block 510 and the signed ID file 140 is communicated to the user.

Figure 6:
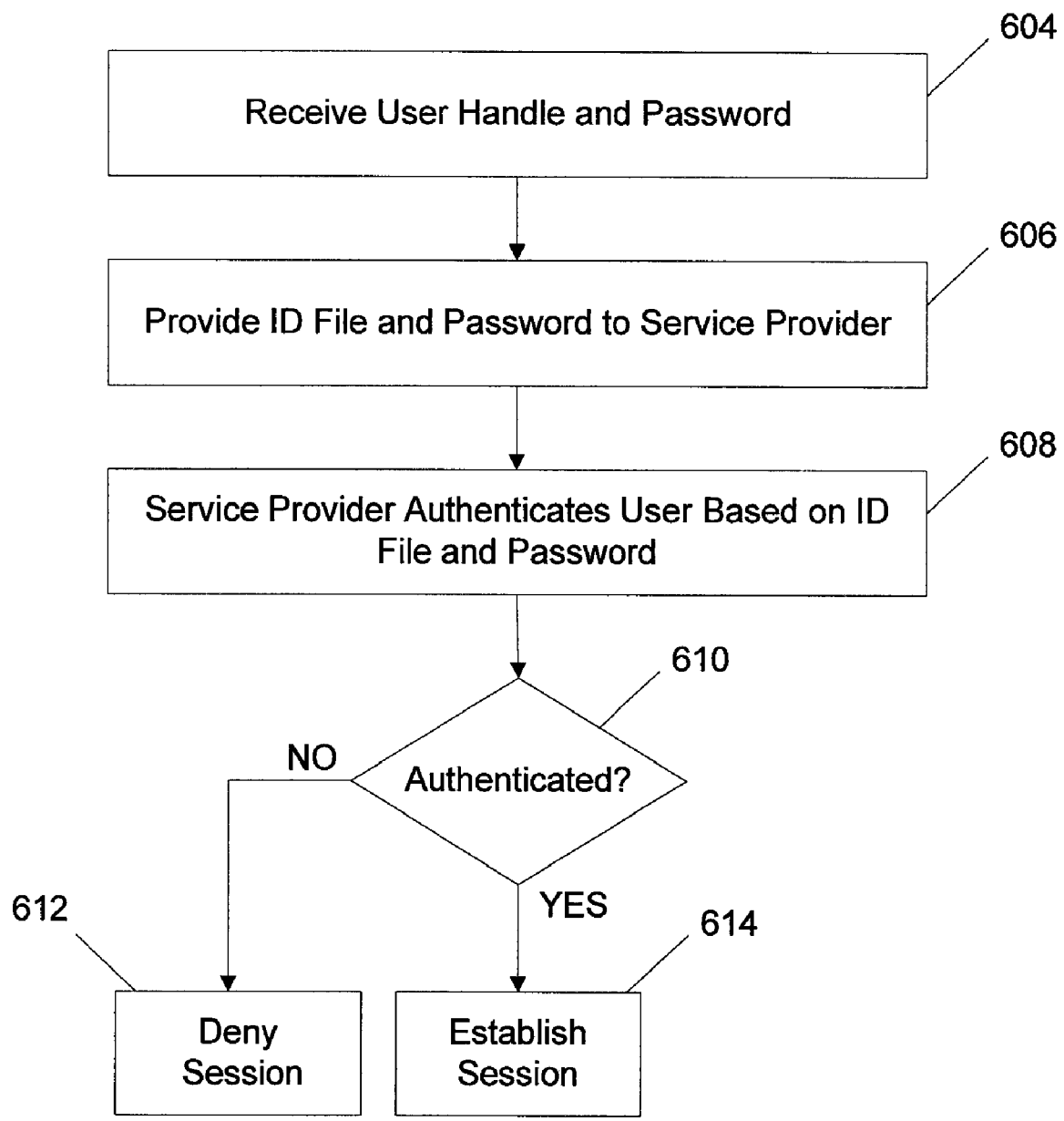
FIG. 6 is a flow diagram illustrating an embodiment of accessing a network.

FIG. 6 is a flow diagram illustrating an embodiment of accessing a network such as described in FIGS. 1-3. Flow begins in block 604 where a user provides their handle and password. Flow continues to block 606 where an ID file 140 associated with the user's handle and the password are provided to a service provider. In one embodiment, the ID file 140 has been signed using a public/private key. In block 608 the service provider authenticates the user based on the ID file 140 and the password. For example, if the ID file 140 has been signed, the service provider decrypts the ID file 140 using a public key provided by an ID file service that signed the ID file.

Flow continues to block 610 where it is determined if the user is authenticated. In one embodiment, included within the ID file 140 is a password that is compared to the password provided by the user to determine if the passwords match. If the passwords match then authentication data in the ID file is evaluated to determine if the user is authenticated. If the user is not authenticated then flow continues to block 612 and the user is denied access to the service provider. If, in block 610, it is determined that the user is authenticated then flow continues to block 614 and a session on the service provider is established.

Figure 7:
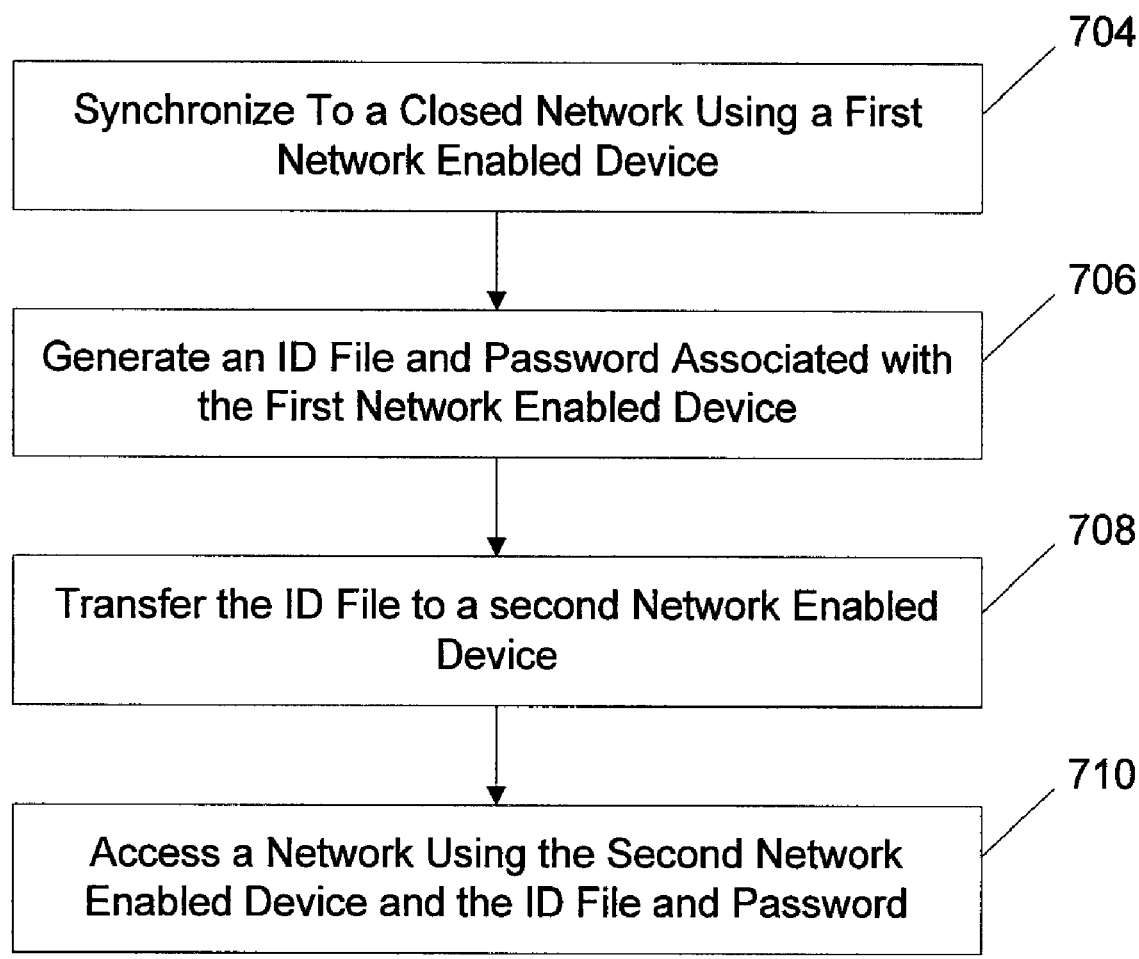
FIG. 7 is a flow diagram illustrating an embodiment of accessing a network.

FIG. 7 is a flow diagram illustrating an embodiment of accessing a network such as described in FIGS. 1-3. Flow begins in block 704 where a user synchronizes to a network using a first network enabled device. For example, the first network enabled device could be a game console, a PC, a PDA, a cell phone, or other network enabled device. In block 706 an ID file 140 and password associated with the user is generated. Then in block 708 the ID file 140 is transferred to a second network enabled device. Examples of the second network enabled device include a game console, a PC, a PDA, a cell phone, or other network enabled device. Using the password and ID file, the user accesses a network using the second network enabled device. Because the second network enabled device gained access to the network using the ID file 140 and password associated with the user, the user can access their accounts on the network using the second network enabled device.

The ID file 140 and password allow the user to access their accounts on the same, or different, networks using different network enabled devices. For example, a user could access a first network using an ID file 140 and password using a first network enabled device, like a game console. The user can use the ID file 140 and password to access the same, or a different network, using a second network enabled device. The second network enabled device can be the same type of network enabled device as the first network enabled device or it can be a different type of network enabled device. In this way, a user can access their accounts using different network enabled devices.

The above is an example of using the ID file to such that both a licensed and unlicensed network enabled device (client) could access the same licensed Service Provider. Other examples include 1) using the ID file such that the same licensed network enabled device (client) could access both a licensed and unlicensed Service Provider; and 2) using the ID file such that an unlicensed network enabled device (client) could access an unlicensed Service Provider.

Figure 8:
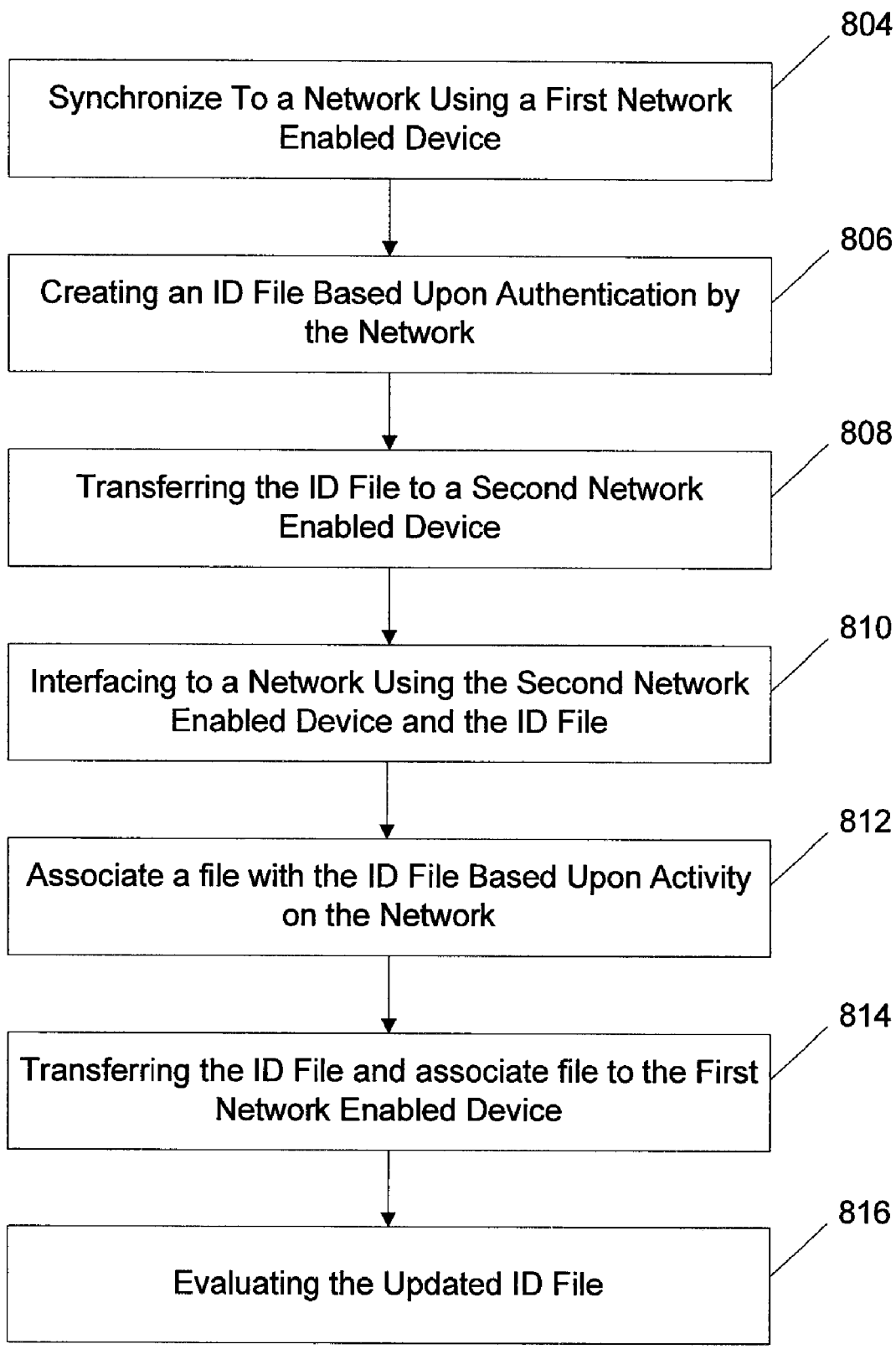
FIG. 8 is a flow diagram of an embodiment for transferring information between two network enabled devices.

FIG. 8 is a flow diagram of an embodiment for transferring information between two network enabled devices such as described in FIGS. 1-3. Flow begins in block 804 where a first network enabled device is used to synchronize to a network using a first network enabled device. Then, in block 806, an ID file 140 is created based upon authentication by the first network. Flow continues to block 808 and the ID file 140 is transferred to a second network enabled device.

In block 810, the second network enabled device uses the ID file 140 to access a network. For example, the second network enabled device can access the same network that the first network enabled device accessed, or it could access a different network. In block 812, a file can be associated with the ID file 140 and the associated file is updated based upon activity on the network by the second network enabled device. For example, information identifying network sites visited by the second network enabled device, or activities engaged in by the second network enabled device such as items that were purchased, or other information, can be included in the associated file.

In block 814 the ID file 140 and associated file are transferred to the first network enabled device. In block 816, the associated file is evaluated. For example, the associated file can be evaluated to determine what network sites were visited by the second network enabled device, if items were purchased, or other types of network activities.

While the examples above describe two network enabled devices, more than two network enabled devices can be used. For example, a first network enabled device can generate an ID file. The ID file 140 can then be used on a second network enabled device. The ID file 140 can be transferred from the second network enabled device to a third network enabled device, and so on. In other words, a user can transfer their associated ID file 140 to an number of network enabled devices to thereby gain access to their accounts using the different network enabled devices. For example, a user can store their ID file 140 on a memory stick, or other removable storage, and carry the removable storage with them so that the user can access their accounts using any available network enabled device.

In one example, a user may access an online game using their ID file 140 on a game console at home. When leaving home, the user may transfer the ID file 140 to a removable storage device and take the storage device with them. Then the user may access the same online game using a PC at another location, such as at a friends house, using the ID file. Because the user is using the same ID file 140 the game provider will allow the user access to their account and the user can reenter the game at the same point they previously ended. When the user leaves their friend's house, the ID file 140 can be updated. The user can then transfer the ID file 140 to their cell phone, PDA or other mobile device that has online access, and again reenter the game at the same point.

Likewise, the user can access other features of their accounts, besides game play, from these various network enabled devices. For example, when online with their cell phone they can message their buddies and let them know when the user will be arriving back home and back online.

Figure 9:
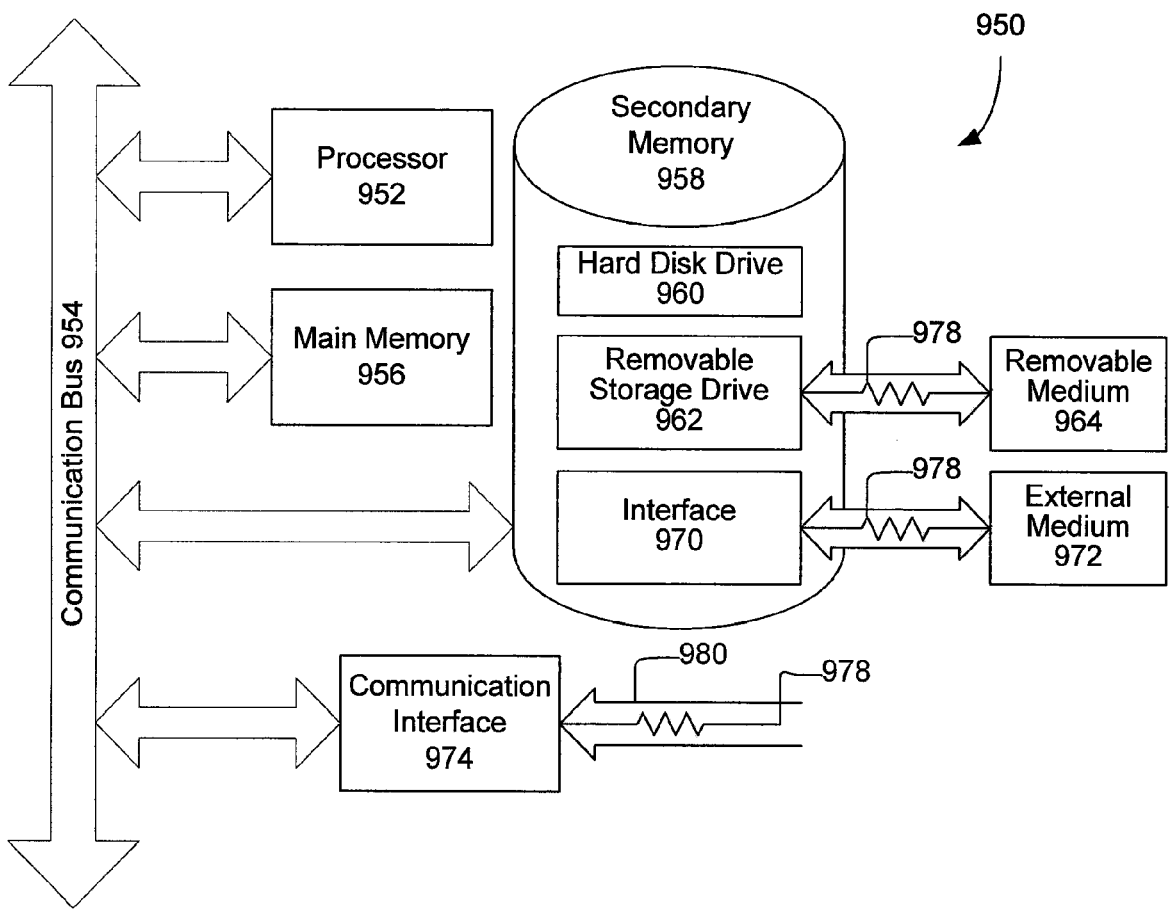
FIG. 9 is a block diagram illustrating an example network enabled device that may be used in connection with various embodiments described.

FIG. 9 is a block diagram illustrating an example network enabled device 950 that may be used in connection with various embodiments described herein. Other network enabled devices, such as other computers or game consoles and/or architectures may be used, as will be clear to those skilled in the art.

The network enabled device 950 preferably includes one or more processors, such as processor 952. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor, for example if parallel processing is to be implemented. Such auxiliary processors or coprocessors may be discrete processors or may be integrated with the processor 1352.

The processor 952 is preferably connected to a communication bus 954. The communication bus 954 may include a data channel for facilitating information transfer between storage and other peripheral components of the computer system 950. The communication bus 954 further may provide a set of signals used for communication with the processor 952, including a data bus, address bus, and control bus (not shown). The communication bus 954 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The network enabled device 950 preferably includes a main memory 956 and may also include a secondary memory 958. The main memory 956 provides storage of instructions and data for programs executing on the processor 952. The main memory 956 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 958 may optionally include a hard disk drive 960 and/or a removable storage drive 962, for example a floppy disk drive, a magnetic tape drive, a compact disc ("CD") drive, a digital versatile disc ("DVD") drive, a memory stick, etc. The removable storage drive 962 reads from and/or writes to a removable storage medium 964 in a well-known manner. Removable storage medium 964 may be, for example, a CD, DVD, a flash drive, a memory stick, etc.

The removable storage medium 964 is preferably a computer readable medium having stored thereon computer executable code (i.e., software) and/or data. The computer software or data stored on the removable storage medium 964 is read into the computer system 950 as electrical communication signals 978.

In alternative embodiments, secondary memory 958 may include other similar means for allowing computer programs or other data or instructions to be loaded into the computer system 950. Such means may include, for example, an external storage medium 972 and an interface 970. Examples of external storage medium 972 may include an external hard disk drive or an external optical drive, or and external magneto-optical drive.

Other examples of secondary memory 958 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 972 and interfaces 970, which allow software and data to be transferred from the removable storage unit 972 to the network enabled device 950.

The network enabled device 950 may also include a communication interface 974. The communication interface 974 allows software and data to be transferred between the network enabled device 950 and external devices, networks, or information sources. For example, computer software or executable code may be transferred to network enabled device 950 from a network server via communication interface 974. In addition, the communication interface 974 can establish and maintain communications, both wired and wireless, to external networks, such as the Internet. Examples of communication interface 974 include a modem, a network interface card ("NIC"), a communications port, a PCMCIA slot and card, an infrared interface, and an IEEE 1394 firewire, a wireless LAN, an IEEE 802.11 interface, an IEEE 802.16 interface, a Blue Tooth interface, a mesh network interface, just to name a few.

Communication interface 974 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 974 are generally in the form of electrical communication signals 978. These signals 978 are preferably provided to communication interface 974 via a communication channel 980. The communication channel 980 carries the signals 978 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) can be stored in the main memory 956 and/or the secondary memory 958. Computer programs can also be received via the communication interface 974 and stored in the main memory 956 and/or the secondary memory 958. Such computer programs, when executed, enable the computer system 950 to perform the various functions of the present invention as previously described.

In this description, the term "computer readable medium" is used to refer to any media used to store data and/or provide computer executable code (e.g., software and computer programs) to the network enabled device 9050. Examples of these media include main memory 956, secondary memory 958 (including hard disk drive 960, removable storage medium 964, and external storage medium 972), and any peripheral device communicatively coupled with communication interface 974 (including a network information server or other network device). These computer readable mediums are means for providing executable code, programming instructions, and software, or storing and/or recording data to the network enabled device 950.

In an embodiment that is implemented using software, the software may be stored on a computer readable medium and loaded into the network enabled device 950 by way of removable storage drive 962, interface 970, or communication interface 974. In such an embodiment, the software is loaded into the network enabled device 950 in the form of electrical communication signals 978. The software, when executed by the processor 952, preferably causes the processor 952 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A method for authenticating a network user, the method comprising:
   receiving a ticket of authentication from a first network using a first network enabled device, the ticket of authentication comprising a unique identifier associated with the network user;
   providing the ticket of authentication to an ID file service within a second network to generate an encrypted user ID file compatible with the second network;
   receiving the encrypted user ID file from the ID file service, the encrypted user ID file based upon information in the ticket of authentication; and
   providing the encrypted user ID file to a second network enabled device that accesses a service provider within the second network, wherein the network user is authenticated by the service provider based upon the ID file and a password provided by the network user.

2. The method of claim 1, wherein the first network enabled device comprises a game console.

3. The method of claim 1, wherein the second network enabled device comprises a second game console.

4. The method of claim 1, wherein the second network enabled device comprises a personal computer.

5. The method of claim 1, wherein the second network enabled device comprises a cell phone.

6. The method of claim 1, wherein the ID file is encrypted using a private key.

7. The method of claim 6, further comprising the service provider decrypting the ID file using a public key.

8. The method of claim 1, further comprising navigating the service provider and purchasing services for use by the user on the first network.

9. The method of claim 1, further comprising associating a file with the ID file in response to activity on the second network.

10. The method of claim 1, wherein the user ID file comprises triggering data that will activate upon the occurrence of a predetermined event.

11. A method for authenticating a network user; the method comprising:
    accessing a server in a first network using a first network enabled device;
    receiving a ticket of authentication from the first network, the ticket of authentication comprising a unique identifier associated with the network user;
    providing the ticket of authentication to an ID file service within a second network to generate an encrypted user ID file compatible with the second network;
    receiving the encrypted user ID file based on information in the ticket of authentication; and
    providing the encrypted user ID file to the second network enabled device, wherein the second network enabled device uses the encrypted ID file to access a service provider within the second network wherein the user is authenticated by the service provider based upon the ID file and a password provided by the network user.

12. The method of claim 11, wherein the first network enabled device comprises a game console.

13. The method of claim 11, wherein the second network enabled device comprises a second game console.

14. The method of claim 11, wherein the second network enabled device comprises a personal computer.

15. The method of claim 11, wherein the second network enabled device comprises a cell phone.

16. The method of claim 11, further comprising associating a file with the ID file in response to activity on the second network.

17. The method of claim 16, further comprising providing the associated file and the ID file to the first network enabled device.

18. The method of claim 11, wherein the user ID file comprises triggering data that will activate upon the occurrence of a predetermined event.

19. A system comprising:
a first network enabled device used to access a sever in a first network that limits access to a set of authorized users, the server includes an authentication module that authenticates that the user is a member of the set of authorized users and provides a ticket of authentication to the user,
wherein the device provides the ticket of authentication to an ID file service within a second network, and generates an ID file compatible with the second network for a user; and
a second network enabled device used by the user, wherein the ID file is used to access a service provider within the second network,
wherein authentication by the service provider based upon the ID file and a password provided by the user.

20. The system of claim 19, wherein the first network enabled device comprises a game console.

21. The system of claim 19, wherein the second network enabled device comprises a game console.

22. The system of claim 19, wherein the second network enabled device comprises a personal computer.

23. The system of claim 19, wherein the second network enabled device comprises a cell phone.

24. The system of claim 19, wherein the ID file service encrypts the ID file using a private key.

25. The system of claim 24, wherein the service provider decrypts the ID file using a public key.

26. The method of claim 20, wherein the user navigates the service provider in the second network and purchasing services for use on the first network.

27. The method of claim 20, further comprising associating a file with the ID file in response to activity on the second network.

28. The method of claim 20, further comprising using the associated file and the ID file to access the first network.

29. The method of claim 20, wherein the ID file comprises triggering data that will activate upon the occurrence of a predetermined event.

30. One or more non-transitory tangible computer-readable media comprising processor-executable instructions that, when executed, direct a network enabled device to perform actions comprising:
receive a ticket of authentication from a first network, the ticket of authentication comprising a unique identifier associated with a network user;
providing the ticket of authentication to an ID file service within a second network to generate an encrypted user ID file compatible with the second network;
receive the encrypted user ID file from the ID file service, the encrypted user ID file based upon information in the ticket of authentication; and
provide the encrypted user ID file to a second network enabled, device that accesses the second network, wherein the network user is authenticated by the service provider based upon the ID file and a password provided by the network user.

31. One or more non-transitory tangible computer-readable media comprising processor-executable instructions that, when executed, direct a network enabled device to perform actions comprising:
access a server in a first network using a first network enabled, device;
receive a ticket of authentication from the first network, the ticket of authentication comprising a unique identifier associated with the network user;
provide the ticket of authentication to an ID file service within a second network to generate an encrypted user ID file compatible with the second network;
receive the encrypted user ID file based on information in the ticket of authentication; and
provide the encrypted user ID file to a second network enabled device, wherein the second network enabled device uses the encrypted ID file to access a service provider within the second network wherein the user is authenticated by the service provider based upon the ID file and a password provided by the network user.

\* \* \* \* \*